United States Patent
Haggerty et al.

(10) Patent No.: US 8,738,729 B2
(45) Date of Patent: May 27, 2014

(54) VIRTUAL ACCESS MODULE DISTRIBUTION APPARATUS AND METHODS

(75) Inventors: David T. Haggerty, San Francisco, CA (US); Jerrold Von Hauck, Windermere, FL (US); Stephan V. Schell, San Mateo, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/183,023

(22) Filed: Jul. 14, 2011

(65) Prior Publication Data

US 2012/0047227 A1 Feb. 23, 2012

Related U.S. Application Data

(60) Provisional application No. 61/366,505, filed on Jul. 21, 2010.

(51) Int. Cl.
*G06F 15/16* (2006.01)

(52) U.S. Cl.
USPC .......................................................... 709/217

(58) Field of Classification Search
None
See application file for complete search history.

(56) References Cited

U.S. PATENT DOCUMENTS

| | | | | |
|---|---|---|---|---|
| 5,539,884 | A * | 7/1996 | Robrock, II | 709/227 |
| 7,409,428 | B1 * | 8/2008 | Brabec et al. | 709/206 |
| 7,653,730 | B1 * | 1/2010 | Hoffman et al. | 709/227 |
| 8,082,353 | B2 * | 12/2011 | Huber et al. | 709/229 |
| 8,086,267 | B2 * | 12/2011 | Santori et al. | 455/557 |
| 8,209,392 | B2 * | 6/2012 | Brabec et al. | 709/209 |
| 8,370,445 | B2 * | 2/2013 | Brabec et al. | 709/206 |
| 2004/0215711 | A1 | 10/2004 | Martin et al. | |
| 2004/0267872 | A1 * | 12/2004 | Serdy et al. | 709/200 |
| 2005/0282584 | A1 * | 12/2005 | Faisy | 455/558 |
| 2008/0268815 | A1 | 10/2008 | Jazra et al. | |
| 2009/0029738 | A1 | 1/2009 | Kim et al. | |
| 2009/0077643 | A1 | 3/2009 | Schmidt et al. | |
| 2010/0017861 | A1 * | 1/2010 | Krishnaswamy et al. | 726/7 |
| 2010/0062808 | A1 | 3/2010 | Cha et al. | |
| 2010/0311402 | A1 * | 12/2010 | Srinivasan et al. | 455/418 |
| 2010/0311404 | A1 * | 12/2010 | Shi et al. | 455/419 |
| 2010/0311418 | A1 * | 12/2010 | Shi et al. | 455/432.1 |
| 2010/0311444 | A1 * | 12/2010 | Shi et al. | 455/466 |

(Continued)

FOREIGN PATENT DOCUMENTS

WO    WO2009082759    7/2009

OTHER PUBLICATIONS

CN 201110257879.4 Notification of 1st Office Action (Nov. 5, 2013).

*Primary Examiner* — Brian P Whipple
(74) *Attorney, Agent, or Firm* — Womble Carlyle Sandridge & Rice LLP

(57) ABSTRACT

Apparatus and methods for distributing electronic access client modules for use with electronic devices. In one embodiment, the access client modules are virtual subscriber identity modules (VSIMs) that can be downloaded from online services for use with cellular-equipped devices such as smartphones. The online services may include a point of sale (POS) system that sells electronic devices to users. A broker may be used to facilitate the selection of a virtual subscriber identity module. A provisioning service may also be used to provision the selected VSIM.

17 Claims, 2 Drawing Sheets

(56) References Cited

U.S. PATENT DOCUMENTS

| | | | |
|---|---|---|---|
| 2011/0028135 A1* | 2/2011 | Srinivasan | 455/415 |
| 2011/0059773 A1* | 3/2011 | Neumann et al. | 455/558 |
| 2011/0153762 A1* | 6/2011 | Brabec et al. | 709/206 |
| 2011/0194553 A1* | 8/2011 | Sahin et al. | 370/352 |
| 2011/0306318 A1* | 12/2011 | Rodgers et al. | 455/410 |
| 2012/0259938 A1* | 10/2012 | Brabec et al. | 709/206 |
| 2012/0309355 A1* | 12/2012 | Pudney et al. | 455/411 |
| 2013/0212196 A1* | 8/2013 | Brabec et al. | 709/206 |

* cited by examiner

VIRTUAL ACCESS MODULE DISTRIBUTION APPARATUS AND METHODS

PRIORITY AND RELATED APPLICATIONS

This application claims priority to U.S. Provisional Patent Application Ser. No. 61/366,505 filed Jul. 21, 2010 and entitled "VIRTUAL SUBSCRIBER IDENTITY MODULE DISTRIBUTION SYSTEM", the foregoing being incorporated herein by reference in its entirety.

This application is also related to co-owned, co-pending U.S. Provisional Patent Application Ser. Nos. 61/354,653 filed on Jun. 14, 2010 and entitled "METHODS FOR PROVISIONING SUBSCRIBER IDENTITY DATA IN A WIRELESS NETWORK", 61/366,505 filed on Jul. 21, 2010 and entitled "VIRTUAL SUBSCRIBER IDENTITY MODULE DISTRIBUTION SYSTEM", 61/407,858 filed on Oct. 28, 2010 and entitled "METHODS AND APPARATUS FOR ACCESS CONTROL CLIENT ASSISTED ROAMING", 61/407,861 filed on Oct. 28, 2010 and entitled "MANAGEMENT SYSTEMS FOR MULTIPLE ACCESS CONTROL ENTITIES", 61/407,862 filed on Oct. 28, 2010 and entitled "METHODS AND APPARATUS FOR DELIVERING ELECTRONIC IDENTIFICATION COMPONENTS OVER A WIRELESS NETWORK", 61/407,866 filed on Oct. 28, 2010 and entitled "METHODS AND APPARATUS FOR STORAGE AND EXECUTION OF ACCESS CONTROL CLIENTS", 61/408,504 filed on Oct. 29, 2010 and entitled "ACCESS DATA PROVISIONING SERVICE", 61/409,891 filed on Nov. 3, 2010 and entitled "METHODS AND APPARATUS FOR ACCESS DATA RECOVERY FROM A MALFUNCTIONING DEVICE", 61/410,298 filed on Nov. 4, 2010 and entitled "SIMULACRUM OF PHYSICAL SECURITY DEVICE AND METHODS", 61/413,317 filed on Nov. 12, 2010 and entitled "APPARATUS AND METHODS FOR RECORDATION OF DEVICE HISTORY ACROSS MULTIPLE SOFTWARE EMULATION", Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", and Ser. No. 12/353,227 filed on Jan. 13, 2009, and entitled "POSTPONED CARRIER CONFIGURATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications systems, and more particularly in one exemplary aspect, to wireless systems that allow user devices to authenticate to wireless networks (e.g., cellular networks, WLANs, WMANs, etc.) using access control clients.

2. Description of Related Technology

This relates generally to wireless systems such as systems in which devices communicate using cellular networks.

Wireless systems are used to provide voice and data services to user devices such as cellular telephones and computers.

Wireless devices are typically provided with Subscriber Identity Module (SIM) cards. When a SIM card is manufactured, the SIM card is not tied to any particular user's account. During a typical SIM card activation process, a user's account at a carrier is tied to the SIM card. A device that contains a SIM card that has been activated in this way can be used to obtain network services from the carrier.

It may not always be desirable to require the use of SIM cards. For example, a user might want to purchase wireless services even when the user is not able to easily obtain a SIM card.

Additionally, expensive wireless (e.g., cellular) devices are commonly subsidized for the customer; i.e., sold to a customer at a loss such that the carrier can recoup the cost of the subsidy with a service contract. Carrier subsidy practice enables carriers to embed the true cost of expensive devices within a reasonable service fee, paid over a contract period, thus enabling a broader market for consumption. The term "subsidy lock" as used herein refers generally and without limitation to the mechanism by which the device is locked to operate only with the appropriate carrier. In existing solutions, subsidy lock is difficult to enforce, as the SIM card is locked to the carrier, not the device itself.

It would therefore be desirable to be able to provide improved methods and apparatus via which to provide users with the ability to obtain and use wireless network services. Moreover, it would be desirable to improve the ability to enforce subsidy locking within a wireless network.

SUMMARY OF THE INVENTION

The present invention addresses the foregoing needs by providing, inter alia, apparatus and methods for providing users with the ability to obtain and use wireless network services. In a first aspect of the invention, a method for distributing access clients is disclosed. In one embodiment, the method includes: requesting an access client, the requesting causing: determining an allowed carrier; provisioning an access client associated with the allowed carrier; and providing one or more identifiers associated with the provisioned access client; receiving the provided one or more identifiers; requesting service activation with a selected one of the provided one or more identifiers; and responsive to successful service activation, downloading the access client associated with the selected one identifier.

In one variant, the access client is a virtual subscriber identity module (VSIM), and the selected one identifier is an International Mobile Equipment Identity (IMEI).

In another embodiment, the method is for distributing VSIMs, and includes: at an online service implemented using computing equipment, receiving a request for a virtual subscriber identity module (VSIM) that includes an International Mobile Equipment Identity (IMEI); and in response to receiving the request, downloading the VSIM to an electronic device over a communications network from the online service.

In a second aspect of the invention, network apparatus for reserving virtual subscriber identity modules (VSIMs) for a consumer device is disclosed. In one embodiment, the apparatus includes: communications circuitry adapted to communicate with a communications network, the communications network comprising at least one broker entity and one or more consumer devices; a processor; and a storage device in data communication with the processor. The storage device includes computer-executable instructions configured to, when executed by the processor: request one or more VSIMs for an identifier associated with a device, the request causing an allocation of the one or more VSIMs; and request service activation for the identifier associated with the device, thereby causing download of the allocated one or more VSIMs to the device.

In one variant, the requested one or more VSIMs is/are stored within a provisioning service.

In another variant, the requested one or more VSIMs is/are generated at a trusted service management entity.

In yet another variant, the generated one or more VSIMs is/are wrapped with a device-specific wrapper.

In a third aspect of the invention, network apparatus for use with a point of sale (POS) entity and a virtual subscriber identity module (VSIM) provisioning service is disclosed. In one embodiment, the apparatus includes: communications circuitry adapted to communicate with a communications network, the communications network comprising the POS entity and the provisioning service; a processor; and a storage device in data communication with the processor. The storage device includes computer-executable instructions configured to, when executed by the processor: responsive to a first POS entity requesting one or more VSIMs: determine one or more allowed carriers; obtain one or more VSIMs from the provisioning service; select at least one of the one or more obtained VSIMs; and provide an identifier associated with the selected at least one to the first POS entity.

In one variant, the instructions are further configured to, when executed; receive a request for a VSIM from a device, the request comprising the provided identifier; and transmit the VSIM associated with the identifier to the device.

In another variant, the allowed carriers are determined by a brokering entity, and the brokering entity includes a database that maps a given identifier to one or more authorized carriers.

In a fourth aspect of the invention, a method for brokering virtual subscriber identity modules (VSIMs) is disclosed. In one embodiment, the method includes: receiving a request for one or more VSIMs; obtaining one or more VSIMs from a provisioning service; selecting at least one of the one or more obtained VSIMs; and associating an identifier with the selected at least one VSIM.

In one variant, the method further includes: receiving a request comprising the associated identifier; and providing the selected VSIM.

In another variant, the obtained VSIMs are specific to a device.

In yet another variant, the method additionally includes releasing one or more unselected ones of the obtained VSIMs.

In a fifth aspect of the invention, a computer readable apparatus is disclosed. In one embodiment, the apparatus includes a storage medium containing at least one computer program which, when executed, causes brokering of VSIMs.

In a sixth aspect of the invention, a VSIM brokering system is disclosed. In one embodiment, the system includes at least one POS or distribution entity, and at least one provisioning entity, each in communication over a network with a brokering entity.

Further features of the present invention, its nature and various advantages will be more apparent from the accompanying drawings and the following detailed description.

BRIEF DESCRIPTION OF THE DRAWINGS

The features, objectives, and advantages of the invention will become more apparent from the detailed description set forth below when taken in conjunction with the drawings, wherein.

All Figures © Copyright 2009-2010 Apple Inc. All rights reserved.

DETAILED DESCRIPTION OF THE INVENTION

Reference is now made to the drawings wherein like numbers refer to like parts throughout.

Figure 1:
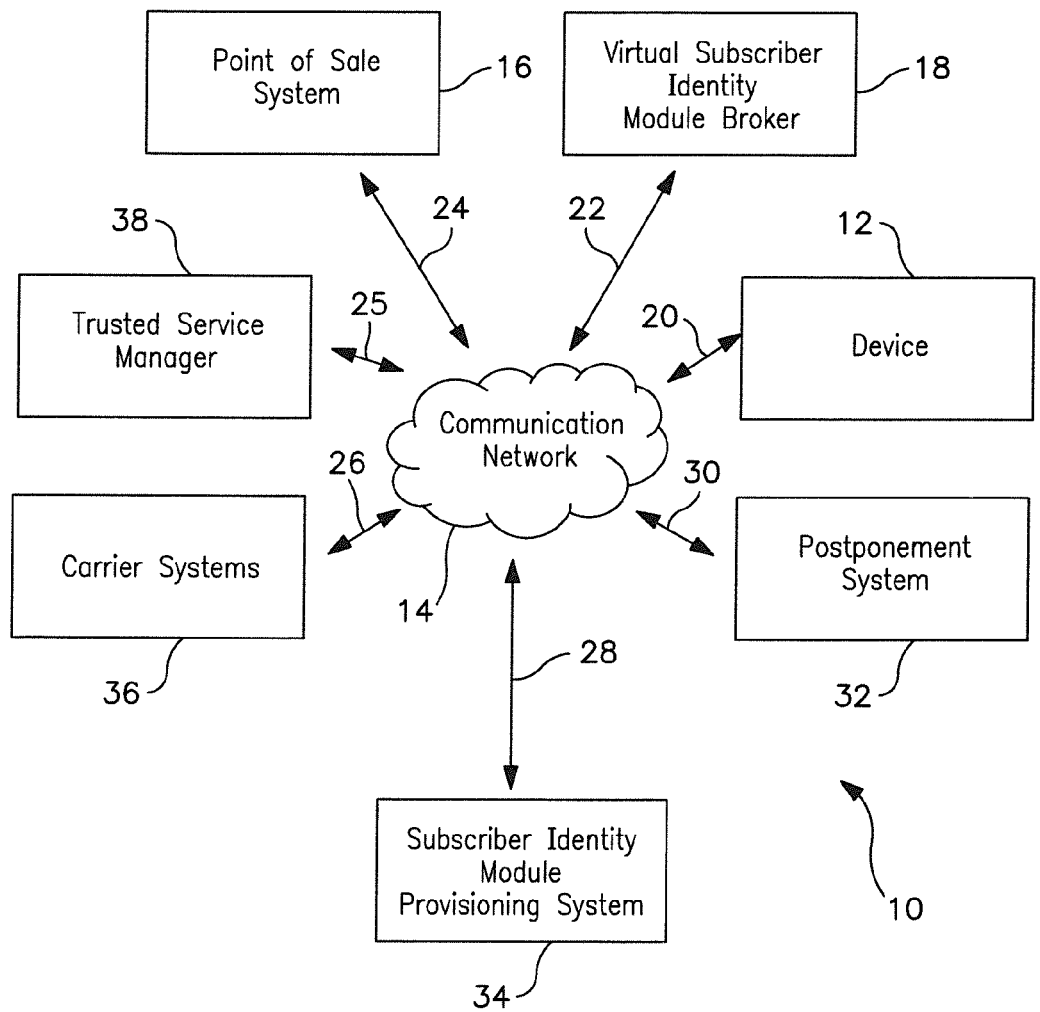
FIG. 1 is a diagram of an illustrative wireless system in accordance with an embodiment of the present invention.

An illustrative wireless system 10 in which a user may obtain wireless network services is shown in FIG. 1. A user in system 10 may be associated with device 12. Device 12 may be a cellular telephone, a computer with cellular telephone communications circuitry, or other wireless user equipment. Device 12 may obtain wireless services from a wireless network. The wireless network from which device 12 obtains wireless services may be, for example, a cellular telephone network that is part of communications network 14. Network 14 may include cellular telephone network equipment, wired and wireless local area network equipment, the internet and other wide area networks, other network equipment, and combinations of such equipment.

System 10 may include services from which the user may purchase wireless products. As an example, a user may desire to establish a relationship with a new wireless carrier. To allow the user to obtain services from the wireless carrier, the user may wish to obtain a Subscriber Identity Module (SIM). Rather than obtaining a physical SIM card, the user may obtain an electronic version of the SIM card (sometimes referred to herein as a virtual. SIM or VSIM). A VSIM may include the same type of information that is traditionally stored in a physical SIM card. Unlike a traditional SIM, a VSIM may, if desired, be stored in storage in device 12 other than a SIM card (i.e., a secure storage element such as a non-removable storage element, solid state storage that is part of a multiuse nonvolatile memory, etc.). With this type of approach, multiple VSIMs may be stored in a single device. A user may also readily obtain a new VSIM when service with a new carrier is desired (e.g., when the user is traveling). Because physical SIM card installation procedures can be avoided, the process of provisioning a new device may be streamlined.

Device 12 and the other components and entities of system 10 may each have associated computing equipment. This computing equipment may be implemented using one or more computers. For example, services may be provided using servers that are implemented using one or more computers. The computers for a given server may be located at a single location or may be geographically distributed. The computing equipment of system 10 may interact via communications network 14 and communications paths 20, 22, 24, 25, 26, 28, and 30. Paths (links) 20, 22, 24, 25, 26, 28, and 30 may include wired and wireless links.

A user may use a service that is coupled to network 14 to obtain VSIMs. System 10 may, for example, include a service such as virtual subscriber identity module (VSIM) broker 18. Broker 18 may be implemented using a stand-alone web site or may be implemented as part of another online service (as examples). A broker provides an intermediary service, enabling a user, point-of-sale entity, etc. a consolidated interface to request and receive VSIMs from a number of VSIM sources. In one embodiment of the present invention, the broker system limits VSIM transactions intelligently based on various considerations e.g., customer pricing preferences, subsidy lock, etc.

As noted above, wireless devices are commonly subsidized for the customer via subsidy locking. In existing solutions, the subsidy lock is less than ideal, as the SIM card is locked to the carrier, not the device itself.

Accordingly, this deficiency is addressed in at least one aspect of the present invention through use of a broker system that limits the VSIMs that a device can procure and use. In one embodiment, the limitation is based on the distribution channel (e.g., carrier network) that provided the device to the customer.

A user may use device 12 or other equipment to interact with broker 18 over communications network 14. For example, a user may communicate with broker 18 using links 20 and 22 and a web browser or other client software.

Broker 18 may provide a user with an online list of virtual subscriber identity modules (VSIMs) that a user may obtain and use on device 12. For example, when a user contacts broker 18, broker 18 may provide the user with a list of available VSIMs. The VSIMs may be presented, for example, as a list of available carriers and/or carrier services (e.g., a first carrier with unlimited voice and data, a second carrier with voice only, the second carrier with limited voice and data, a third carrier with data only, etc.). The user may interact with on-screen options that allow the user to select and download a desired VSIM to device 12. The VSIMs that are listed by broker 18 may be purchased by the user. A user may, for example, supply credit card information or other account information to broker 18 that broker 18 uses in consummating a purchase transaction. The account information that is provided may be associated with a carrier, with a manufacturer of device 12, or other suitable entities. In some scenarios, a user may be entitled to obtain a VSIM for free. For example, if a user is purchasing a cellular telephone from a carrier for the first time, the user may be entitled to obtain a corresponding VSIM for that cellular telephone by virtue of having purchased the cellular telephone.

Postponement system 32 may be used in the activation of device 12. The postponement system is described in greater detail in U.S. patent application Ser. No. 12/353,227 filed on Jan. 13, 2009, and entitled "POSTPONED CARRIER CONFIGURATION, previously incorporated by reference in its entirety. As described therein, the postponement system can receive a request for activation of a mobile device, enable selection of a telecommunications carrier from a number of telecommunications carriers, and provide information associated with the selected telecommunications carrier for configuring the mobile device.

Unfortunately, subsidy locking presents unique difficulties for postponed VSIM allocation operation. Unlike prior art solutions, postponement enables VSIM devices to be sold without a SIM allocated to the device (prior art solutions often physically packaged the device with an associated SIM card). When a device requests a VSIM after sale, the VSIMs must be limited to the carrier or distribution channel with which the purchased device was associated.

Specifically, in one embodiment, the device 12 may initially operate in an unactivated state. In the unactivated state, device 12 may exhibit reduced functionality. For example, device 12 may primarily or exclusively be able to present the user with instructions that direct the user to plug device 12 into a host computer to access network 14, device 12 may provide only functions other than cellular services, etc. When a user desires to activate device 12, device 12 may communicate with postponement system 32 over paths 20 and 30.

The device 12 may be identified with a serial number or other unique identifier. For example, device 12 may provided with an International Mobile Equipment Identity (IMEI) or other identifier during manufacturing.

In one exemplary embodiment, the device may be authorized to operate with only a particular carrier or carriers. This allows a carrier to subsidize the price of a device by guaranteeing that the device will only be provisioned an appropriate VSIM. Postponement system 32 may maintain a list that maps device identifiers (i.e., IMEIs) to allowed carriers. For example, postponement system 32 may maintain a database that maps a given IMEI to a given authorized carrier. The listing of device identifiers to allowed carriers is in one variant derived from (or limited to) the distribution channels of the devices (e.g., from the manufacturer to the carrier then to the user). In one such variant, the device manufacturer can manufacture devices suitable for resale by a number of carriers, and enable the carriers to subsidy lock the devices to their network, while still enabling postponement capabilities (e.g., a VSIM is not assigned to the device until the consumer is ready to finalize billing).

During activation, device 12 may provide its IMEI to postponement system 32. Postponement system 32 may respond by downloading a list of allowed carrier(s) to device 12. This list of allowed carriers, which may sometimes be referred to as an activation ticket, specifies which wireless carriers the user of device 12 is authorized to use. The allowed carriers in the activation ticket may be identified using MCC (Mobile Country Code) and MNC (Mobile Network Code) information. Each VSIM may include International Mobile Subscriber Identity (IMSI) information that includes MCC and MNC values specifying the carrier(s) associated with that VSIM.

When device 12 is powered up or at other times, device 12 can compare the MCC and MNC information from its VSIM IMSI against the authorized MCC and MNC information in the activation ticket. If these values do not match, device 12 may be maintained in its unactivated state.

Postponement system 32 may provide broker 18 with information on which VSIMs can be provided to a given device. VSIMs will not generally be available, for example, for carriers that are not listed in the activation ticket for a given device 12.

Broker 18 may interact with postponement system 32 to determine which VSIMs will be usable by a device. If a particular device can only be used in connection with a limited set of carriers, for example, broker 18 can avoid presenting the user of device 12 with options to purchase VSIMs that are associated with different carriers. If desired, postponement system 32 or broker 18 may implement rules that are based on the current geographic location of device 12. Device 12 may contain a satellite navigation system circuit such as a Global Positioning System (GPS) circuit or may otherwise obtain information on its current geographic location. Other examples of location determination may receive information from e.g., Wi-Fi broadcasts, cell tower broadcast, association with a given wireless access point (e.g., Wi-Fi AP), thereby localizing the location of the device to at least within range of the AP, user input, etc.

The postponement system 32 may filter out unavailable services based on the geographic location of device 12. For example, postponement system 32 may remove a carrier (or a country in which the carrier operates) when that carrier (or country) is not supported by device 12 based on its current location. Location information may also be used in sorting the order of allowable carriers (e.g., to provide preference to carriers/SIMs that are typically associated with the geographic area in which device 12 is located).

Still other forms of types of filtering may be used to simplify user selection. Some examples of useful filtering may include, without limitation: user and/or network preferences, sponsoring (e.g., where a carrier provides a premium to be listed higher, etc.), pricing, plan type, pre-paid/post-paid, etc. For instance, a user requesting a VSIM may be allowed to select a VSIM from a set of carriers (e.g., determined by the user device subsidy locking), and the set of carriers further categorized from highest to lowest pricing plan.

Thereafter, the broker 18 may collect payment from a user. For example, broker 18 may collect payment when selling a prepaid VSIM to a user. The ability of broker 18 to collect payment from users may facilitate the ability of system 10 to deliver VSIMs to a user.

It is not necessary for broker 18 to limit a user to a single VSIM purchase. For example, broker 18 may request and reserve multiple VSIMs for a given device. Broker 18 may then track which of these VSIMs is delivered to device.

If desired, broker 18 may facilitate the release of undelivered VSIMs. For example, device 12 may be sold to retailer A in country A. In this environment, device 12 may be authorized for use with carriers X, Y, and Z. A separate VSIM for each of these carriers may be preloaded onto device 12 or may be stored at broker 18 in anticipation of being requested and downloaded by a device (e.g., prior to or post shipment of device 12 to retailer A). Pre-loading possible VSIMs that the device may use allows broker 18 to avoid a real-time interaction with trusted service manager 38 (which handles the creation of VSIMs). When device 12 is purchased at retailer A, one of the three VSIMs may be activated and the other two (unused) VSIMs may be released. The release of VSIMs that are not used may help to reduce the costs associated with maintaining VSIMs in system 10. VSIMs may be associated with identifiers such as ICCIDs (Integrated Circuit Card Identifiers) and costs can be minimized by ensuring that uncommitted ICCIDs can be freely reused in system 10.

Additionally, the trusted service manager 38 may handle operations associated with the creation and maintenance of VSIMs. Each VSIM that is created may contain some or all of the values that are included in conventional physical SIM cards. The contents of each VSIM may be encrypted for access by trusted devices. Examples of information that may be included in a VSIM include ICCID information, IMSI information, and other SIM data. Trusted service manager 38 may interact with carriers to set up ranges of VSIMs. For example, a carrier at one of carrier systems 36 may use links such as links 26 and 25 to provide trusted service manager 38 with specified ICCID and IMSI ranges for a number of VSIMs that are to be purchased by the carrier. The carrier may set aside space in their Home Location Register (HLR) in system 36 for these VSIMs. The HLR may link user account information with devices and telephone numbers and may be used in authenticating devices that request network access.

Subscriber identity module provisioning system (SPS) 34 may wrap VSIMs in device-specific wrappers prior to delivery to device 12. In this way, SPS 34 may ensure that a given VSIM can only be provided to one device at a time. SPS 34 may maintain information on the current association between each device and each corresponding VSIM. Common examples of device-specific wrappers include, inter alia, encryption, encoding, formatting, etc. For example, in one embodiment, the VSIM may be encrypted (i.e., wrapped) with a symmetric or asymmetric encryption key specific to the recipient device.

SPS 34 may interface with broker 18 using links such as links 28 and 22. During VSIM provisioning, broker 18 may request a new VSIM for a given device and SPS 34 can deliver a corresponding VSIM that has been encrypted for that particular device. When it is desired to release an unused VSIM, broker 18 can pass information to SPS 34 that informs SPS 34 that a particular VSIM is no longer associated with a given device. If a VSIM has been downloaded to device A, for example, device A may direct broker 18 to release the VSIM back to SPS 34. As part of this process, device A can promise that it will no longer use the released VSIM (unless device A downloads the VSIM again from broker 18). A VSIM can be released to a specific target device or can be released to a generic online storage location (e.g., a storage location maintained by broker 18 or other suitable entity) for later use.

Point-of-sale system (POS) 16 may include computing equipment in a physical store and online store computing equipment. A user may purchase device 12 at POS 16.

After purchasing device 12, the user may wish to download a VSIM onto device 12 using broker 18.

In one illustrative scenario, a customer purchases device 12 before requesting a VSIM. In this type of scenario, POS 16 knows the identity of device 12 and can request assignment of a VSIM to the device by providing device-specific information such as the IMEI for the device or serial number for the device to broker 18. The VSIM may then be reserved by broker 18 until device 12 is powered on and requests downloading of the VSIM. As part of this VSIM assignment process, broker 18 may provide the ICCID associated with the VSIM to POS 16 via paths 22 and 24. POS 16 may use the ICCID to activate service for device 12 (i.e., by interacting with carrier systems 36 to link the user's account to the VSIM).

In another illustrative scenario, POS 16 does not know the identity of device 12 when requesting the VSIM (e.g., when the customer is interested in obtaining the phone number associated with a VSIM from broker 18 before purchasing device 12). In this situation, POS 16 can request a VSIM without first specifying which device it will be assigned to. The requested VSIM may be reserved at broker 18 without assigning the VSIM to a particular device.

This type of scenario may arise during direct fulfillment situations in which a user is buying device 12 online. The VSIM may be a prepaid VSIM that has an associated device telephone number. The user may wish to select from multiple available telephone numbers. Once the user has made a telephone number selection, the POS 16 may assign the corresponding VSIM to the user and may inform the user of the user's new telephone number. As part of this process, broker 18 may provide POS 16 with an ICCID that has not yet been assigned to a device. Later, when POS 16 knows the device identity (e.g., the IMEI of device 12), POS 16 provides the ICCID of the VSIM and the IMEI of the device to broker 18, so that broker 18 can link the VSIM with device 12 (e.g., by contacting carrier systems 36).

Once provisioned, device 12 may obtain a VSIM from broker 18 over path 20. Device 12 may provide broker 18 with a VSIM download request that includes an IMEI, serial number, or other device-specific identifying information. In response, broker 18 may verify whether or not there is a VSIM at broker 18 that is awaiting downloading by device 12. If a VSIM is available, the VSIM may be downloaded and stored in device 12. Device 12 may then be used in system 10 (e.g., to obtain wireless network services from the carrier associated with the VSIM).

Figure 2:
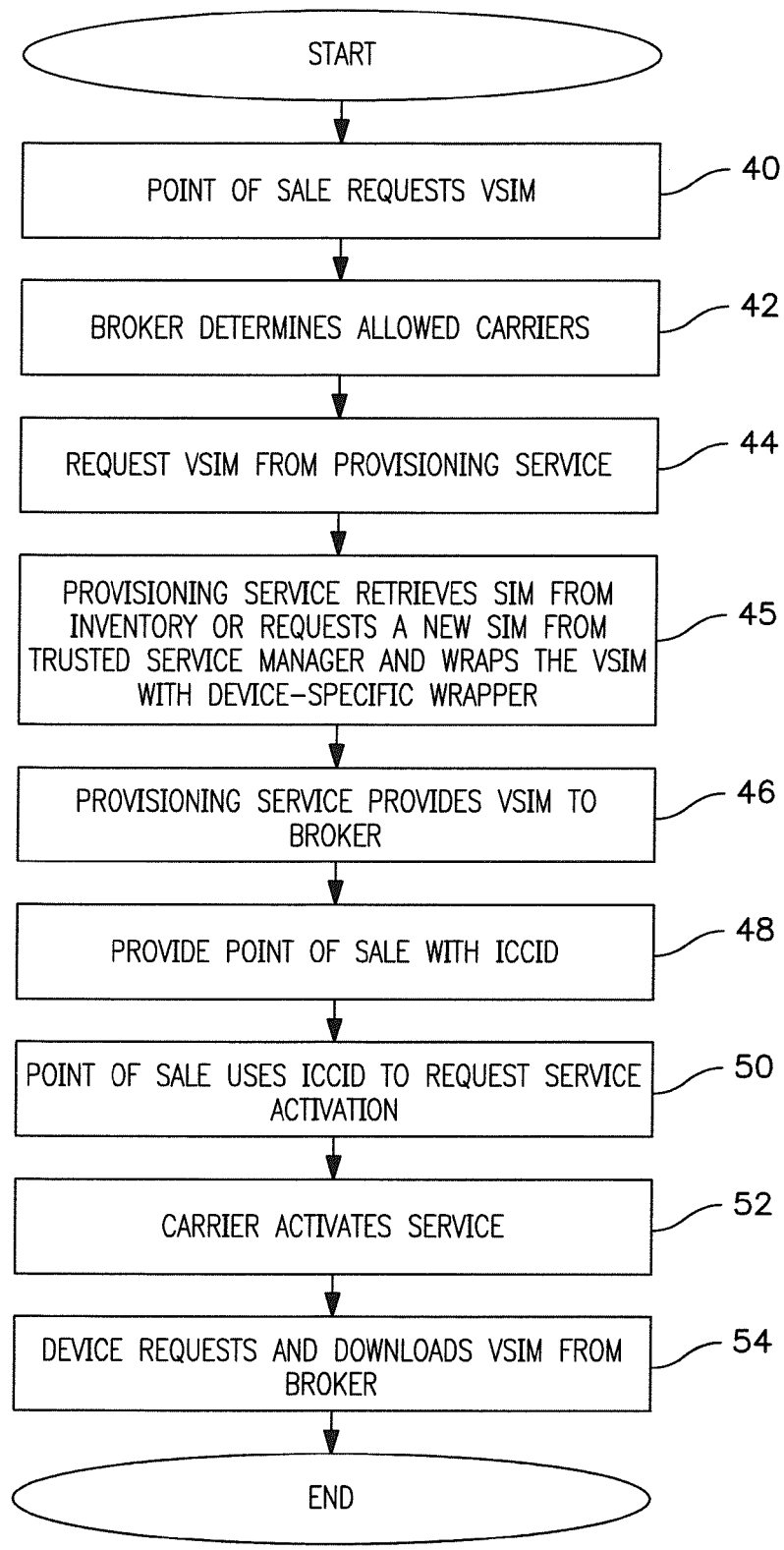
FIG. 2 is a flow chart of illustrative steps for providing a set of allowed VSIMs to a mobile device, in accordance with an embodiment of the present invention.

Illustrative steps involved in operating system 10 of FIG. 1 are shown in FIG. 2.

In the example of FIG. 2, a user purchases a device at POS 16, so POS 16 knows the identity of the purchased device before the VSIM is requested.

At step 40, POS 16 requests a VSIM from broker 18. POS 16 may, for example, formulate a VSIM request for broker 18 that includes an IMEI, serial number, or other identifier associated with device 12.

At step 42, broker 18 may contact postponement system 32 to determine which authorized carriers are associated with the device. System 32 may maintain a mapping of allowed carriers for each IMEI (or other device identifier).

At step 44, broker 18 may request that SPS 34 assign a VSIM to the device that is associated with an appropriate authorized carrier.

At step 45, SPS 34 retrieves a VSIM from inventory or requests a new VSIM from trusted service manager 38 and wraps this VSIM in a device-specific wrapper.

At step 46, in response to the request from broker 18, SPS 34 may provide the corresponding VSIM to broker 18.

At step 48, broker 18 may provide POS 16 with an ICCID or other identifier associated with the VSIM.

At step 50, POS 16 may use the ICCID to activate service for the user. For example, POS 16 may provide the user's telephone number or other account information and the ICCID to the carrier with a request that the carrier link the user to the VSIM and thereby activate the VSIM.

At step 52, the carrier may receive the service activation request from POS 16 and may activate the VSIM.

Broker 18 may retain the VSIM for downloading by device 12. At step 54, the user may power up device 12 and may connect device 12 to communications network 14. For example, the user may attach device 12 to a computer that has internet access using a cable or the user may use device 12 to wirelessly access broker 18. Device 12 may request that the VSIM for the device be downloaded to the device over path 20 from broker 18. This request may include device identifier information such as a serial number, IMEI, or other device identifier. In response to receipt of the request, broker 18 may download the corresponding VSIM to device 12.

If desired, the operations of steps 44 and 46 can be performed in advance of the operations of step 40. If the device can support multiple carriers, the provisioning process can be performed in a batch in advance. Multiple VSIMs can be pre-assigned to the device. When POS 16 requests a VSIM and the device downloads the requested VSIM, the other unused VSIMs can be returned to SPS 34 as having never been used.

While the foregoing procedures for limiting the VSIMs that are available to a user are described primarily in terms of a subsidy lock scenario, the methods and apparatus presented herein have use in a wide range of other applications. For instance, a user may be limited to a set of available VSIMs within a limited inventory; such limited inventory uses may find particular utility in enterprise operations where a number of "seats" are purchased.

Similarly, in another scenario, a user may be limited to VSIMs suitable for a set of preferred partners.

In yet other use cases, a carrier can reduce or even remove the need for a "brick and mortar" storefront to sell wireless devices (and store inventory); instead, devices can be sold directly from an online retail store, with the configuration of device operation performed entirely in software/remotely.

The foregoing is merely illustrative of the principles of this invention and various modifications can be made by those skilled in the art without departing from the scope and spirit of the invention. The foregoing embodiments may be implemented individually or in any combination.

What is claimed is:

1. A method, comprising:
at an online service implemented using computing equipment:
receiving a request for a virtual subscriber identity module (VSIM) that includes an International Mobile Equipment Identity (IMEI) associated with an electronic device;
determining, from a provisioning service, a plurality of allowed carriers that the electronic device is authorized to use;
obtaining, from the provisioning service, a plurality of VSIMs corresponding to the plurality of allowed carriers;
reserving the plurality of obtained VSIMs for the electronic device;
receiving, from a user, selection of a VSIM from the plurality of obtained VSIMs, wherein the plurality of obtained VSIMs includes an unselected VSIM;
downloading the selected VSIM to the electronic device over a communications network from the online service; and
releasing the unselected VSIM for subsequent reuse.

2. A method for distributing access clients, comprising:
receiving a request for an access client for an electronic device;
determining, from a provisioning service, a plurality of allowed carriers that the electronic device is authorized to use;
provisioning the access client, wherein the access client is associated with the plurality of allowed carriers;
determining, from the provisioning service, a plurality of device identifiers that correspond to the plurality of allowed carriers;
reserving the plurality of device identifiers for the electronic device;
providing the plurality of device identifiers to a user associated with the electronic device;
receiving, from the user, selection of one of the plurality of device identifiers, wherein the plurality of device identifiers includes an unselected device identifier;
requesting a service activation with the selected one of the plurality of device identifiers;
releasing the unselected device identifier for subsequent reuse; and
responsive to a successful service activation, providing the access client to the electronic device.

3. The method of claim 2, wherein the access client comprises a virtual subscriber identity module (VSIM).

4. The method of claim 3, wherein the selected one identifier comprises an International Mobile Equipment Identity (IMEI).

5. The method of claim 2, additionally comprising storing the plurality of device identifiers.

6. A network apparatus for reserving virtual subscriber identity modules (VSIMs) for a consumer device, comprising:
communications circuitry adapted to communicate with a communications network, the communications network comprising at least one broker entity and the consumer device;

a processor; and a storage device in data communication with the processor, the storage device comprising computer-executable instructions configured to, when executed by the processor, cause the network apparatus to:
- request a plurality of VSIMs for an identifier associated with the consumer device, the request causing an allocation of the plurality of VSIMs;
- reserve the plurality of VSIMs for the consumer device;
- receive, from a user, selection of a VSIM from the plurality of VSIMs, wherein the plurality of VSIMs includes an unselected VSIM;
- request a service activation for the identifier associated with the device, thereby causing a download of the selected VSIM to the device; and
- release the unselected VSIM for subsequent reuse.

7. The network apparatus of claim 6, wherein the plurality of VSIMs is stored within a provisioning service.

8. The network apparatus of claim 6, wherein the plurality of VSIMs is generated at a trusted service management entity.

9. The network apparatus of claim 8, wherein the plurality of VSIMs is wrapped with a device-specific wrapper.

10. The network apparatus of claim 6, wherein the identifier comprises an Integrated Circuit Card Identifier (ICCID).

11. The network apparatus of claim 6, wherein the plurality of VSIMs is not stored within the network apparatus.

12. A network apparatus for use with a point of sale (POS) entity and a virtual subscriber identity module (VSIM) provisioning service, the network apparatus comprising:
- communications circuitry adapted to communicate with a communications network, the communications network comprising the POS entity and the provisioning service;
- a processor; and
- a storage device in data communication with the processor, the storage device comprising computer-executable instructions configured to, when executed by the processor, cause the network apparatus to:
  - responsive to the POS entity requesting one or more VSIMs for a device:
  - determine, from the VSIM provisioning service, a plurality of allowed carriers that the device is authorized to use;
  - obtain, from the provisioning service, a plurality of VSIMs corresponding to the plurality of allowed carriers;
  - reserve the plurality of obtained VSIMs for the device;
  - receive, from a user, selection of a VSIM from the plurality of obtained VSIMs, wherein the plurality of obtained VSIMs includes an unselected VSIM;
  - release the unselected VSIM for subsequent reuse; and
  - provide an identifier associated with the selected VSIM to the POS entity.

13. The network apparatus of claim 12, wherein the instructions are further configured to, when executed by the processor, cause the network apparatus to:
- receive a request for the selected VSIM, wherein the request includes the identifier; and
- transmit the selected VSIM associated with the identifier to the device.

14. The network apparatus of claim 12, wherein the allowed carriers are determined by a brokering entity.

15. The network apparatus of claim 14, wherein the brokering entity comprises a database that maps a given identifier to one or more authorized carriers.

16. The network apparatus of claim 12, wherein the plurality of VSIMs are wrapped to ensure that the selected VSIM can only be provided to the device.

17. The network apparatus of claim 12, wherein the identifier comprises an Integrated Circuit Card Identifier (ICCID).

* * * * *